United States Patent

[11] 3,619,730

[72] Inventors: Alexander R. W. Broadway, Westbury-on-Trym, Bristol; William Fong, Westbury-on-Trym, Bristol; Gordon H. Rawcliffe, Bristol, all of England
[21] Appl. No. 860,743
[22] Filed Sept. 24, 1969
[45] Patented Nov. 9, 1971
[73] Assignee National Research Development Corporation, London, England
[32] Priority Sept. 25, 1968
[33] Great Britain
[31] 45,449/68

[54] TWO-SPEED, SINGLE-PHASE ELECTRIC MOTOR
9 Claims, 18 Drawing Figs.
[52] U.S. Cl. .................................................. 318/224 R
[51] Int. Cl. ........................................ H02k17/14, H02k 17/16

[50] Field of Search............................................ 318/224, 224.1, 225

[56] References Cited
UNITED STATES PATENTS
2,174,758  10/1939  Rall .............................. 318/224
2,267,805  12/1941  Appleman ..................... 318/224
3,233,160  2/1966   Rawcliffe ...................... 318/224

Primary Examiner—Gene Z. Rubinson
Attorney—Larson, Taylor and Hinds

ABSTRACT: A two-speed, single-phase, alternating current motor having a concentric wound stator winding comprising a main energizing winding and an auxiliary starting winding, the main winding (or both windings) being tapped and arranged for reconnection at one speed to provide current reversal in selected winding parts, thus providing pole-changing by the known method of pole-amplitude modulation.

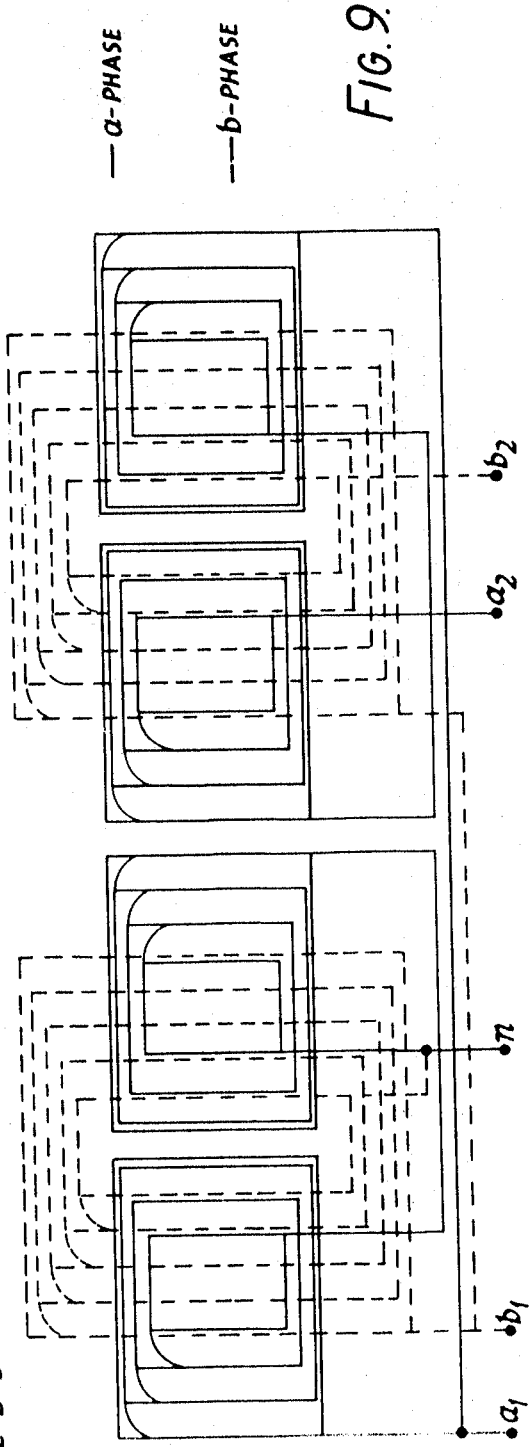

FIG. 10.

1 2 3 4 5 6 7 8 9 10 11 12 13 14 15 16 17 18 19 20   COIL-GROUP NUMBERS

| a  b -a -b | a  b -a -b  a  b | -a -b  a  b -a | -b  a  b -a -b |   (A) 10-POLE WINDING LAYOUT, AND 4-POLE TOTAL MODULATION a  b -a -b  a -b  a  b -a -b -a -b  a  b -a  b -a -b  a  b    6-POLE RESULTANT

ORIGIN OF a-PHASE
4-POLE MODULATING CYCLE ↓

| a    -a    a | -a    a    -a    a    -a | a    -a |    MODULATION OF
(B) EACH PHASE-WINDING BY INDIVIDUAL 4-POLE WAVES

ORIGIN OF b-PHASE
4-POLE MODULATING CYCLE ↓

| b  -b | b  -b   b | -b   b | -b   b   -b a | b -a | -b | a  b | -a | -b | a  b | -a | -b | a  b | -a -b | a  b | -a | -b   (C) 16-POLE TOTAL MODULATION a -b -a  b  a  b  a  b -a  b -a  b  a -b -a -b -a  b  a -b    6-POLE RESULTANT

TWO-SPEED, SINGLE-PHASE ELECTRIC MOTOR

This invention relates to rotary electric machines, particularly to two-speed, single-phase, alternating current motors.

The method of pole-changing by pole-amplitude modulation (p.a.m.) is now well known in relation to 3-phase windings. A number of patent specifications and technical articles explain the method, and describe various techniques which have been developed for its practical application.

Pole-changing single-phase motors may also be designed using the same basic principle.

Double-layer p.a.m. windings for single-phase motors are described in U.S. Pat. No. 3,233,160. Such windings are, in construction, 3-phase p.a.m. windings connected so that one phase acts as an auxiliary, starting winding, and the other two phases are energized from a single-phase supply.

However, manufacturers of small single-phase motors prefer the concentric type of winding on economic grounds. This type of winding has fewer coils, fewer end-winding connections and may be wound more readily by automatic machines than the double-layer windings commonly used in 3-phase motors.

The object of the present invention is the application of p.a.m. to concentric windings.

Accordingly, the present invention provides a two-speed, single-phase, alternating current motor having a stator winding comprising main winding and auxiliary winding portions, the auxiliary winding being for providing starting torque, at least the main winding having alternative connections corresponding to the reversal in current-carrying sense of selected portions thereof and corresponding to pole-amplitude modulation of the winding, to provide one or the other of alternative running pole-numbers.

In order that the invention may be more fully understood and readily carried into practice, the principle of the invention will be described, by way of explanation and not by way of limitation, and practical embodiments will be described in detail, by way of example, with reference to the accompanying drawings, in which.

Figure 2A:
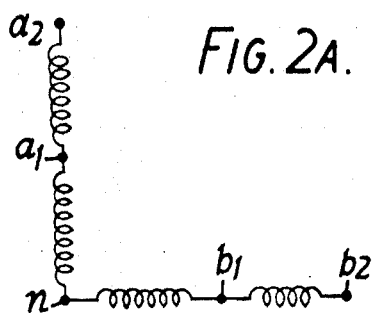
FIGS. 2A and 2B are winding diagrams showing the phase-winding connections and switching for a change-speed split-phase motor.

FIG. 2A showing parallel/series connections; and

Figure 3:
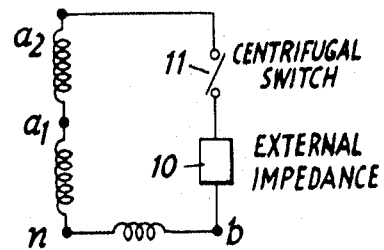
Figure 2B:
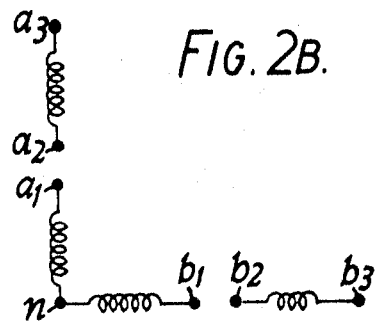
Figure 4:
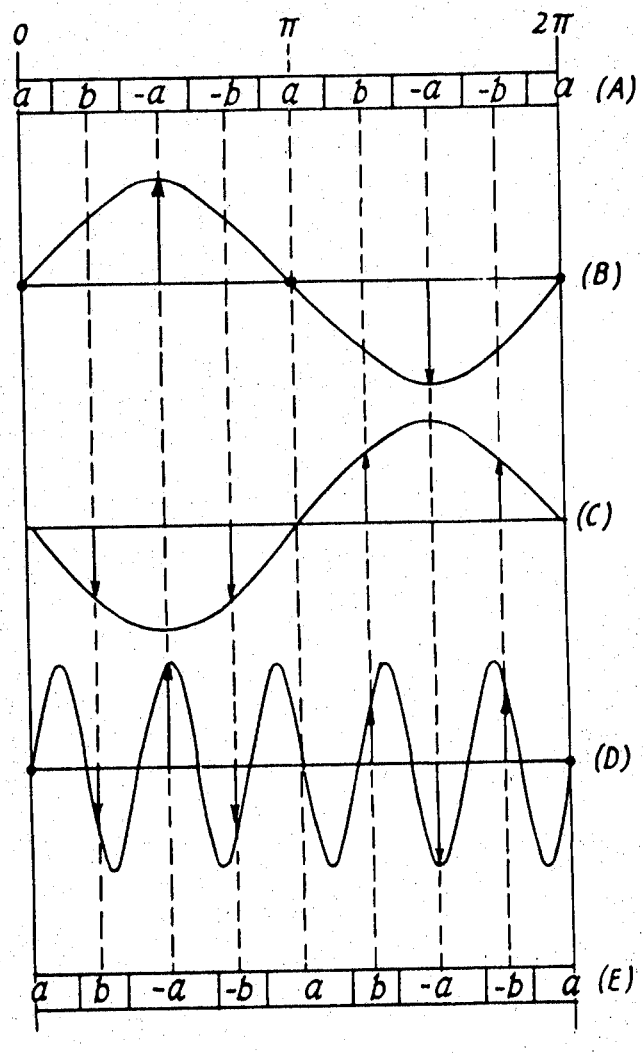
Figure 5:
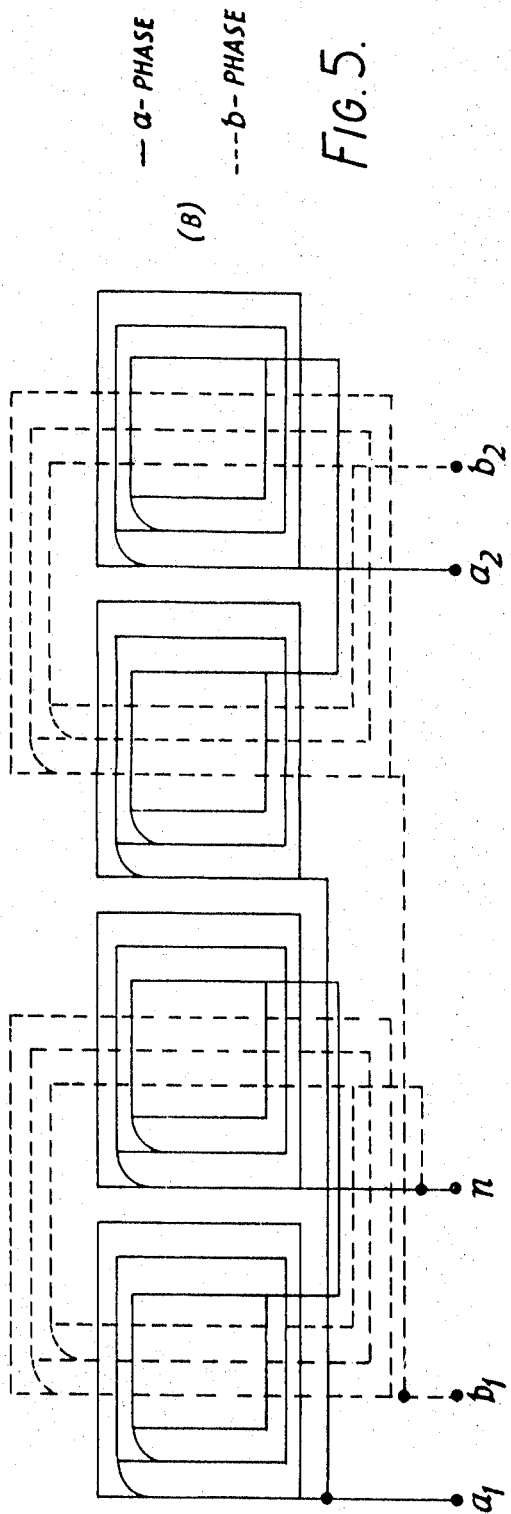
Figure 6A:
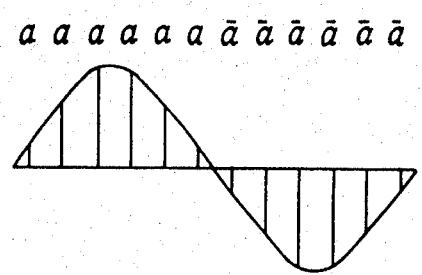
Figure 6B:
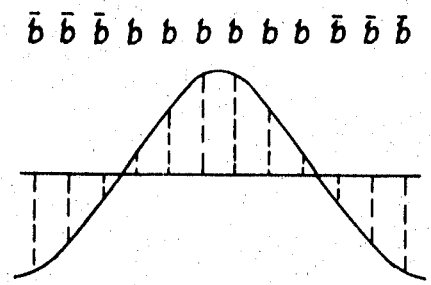
Figure 6C:
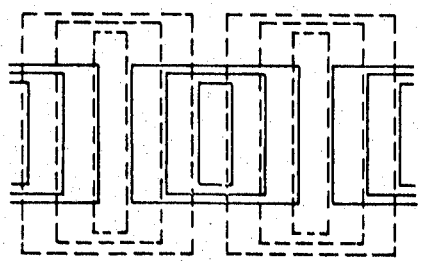

FIG. 2B showing series/series connections;

FIG. 3 is a diagram showing phase-winding connections for starting, with respect to one only of the alternative pole-numbers;

FIG. 4 is a composite diagram showing the modulation of a 2-phase, 4-pole winding to provide 6 poles;

FIG. 5 is a winding diagram showing a split-phase, single-layer, concentric 4-pole/6-pole winding in 36 slots;

FIGS. 6A, 6B and 6C comprise three diagrams showing the distribution of conductors of a 2-pole, split-phase, concentric winding in 12 slots;

FIG. 6A showing the main winding distribution;

FIG. 6B showing the auxiliary winding distribution; and

Figure 7:
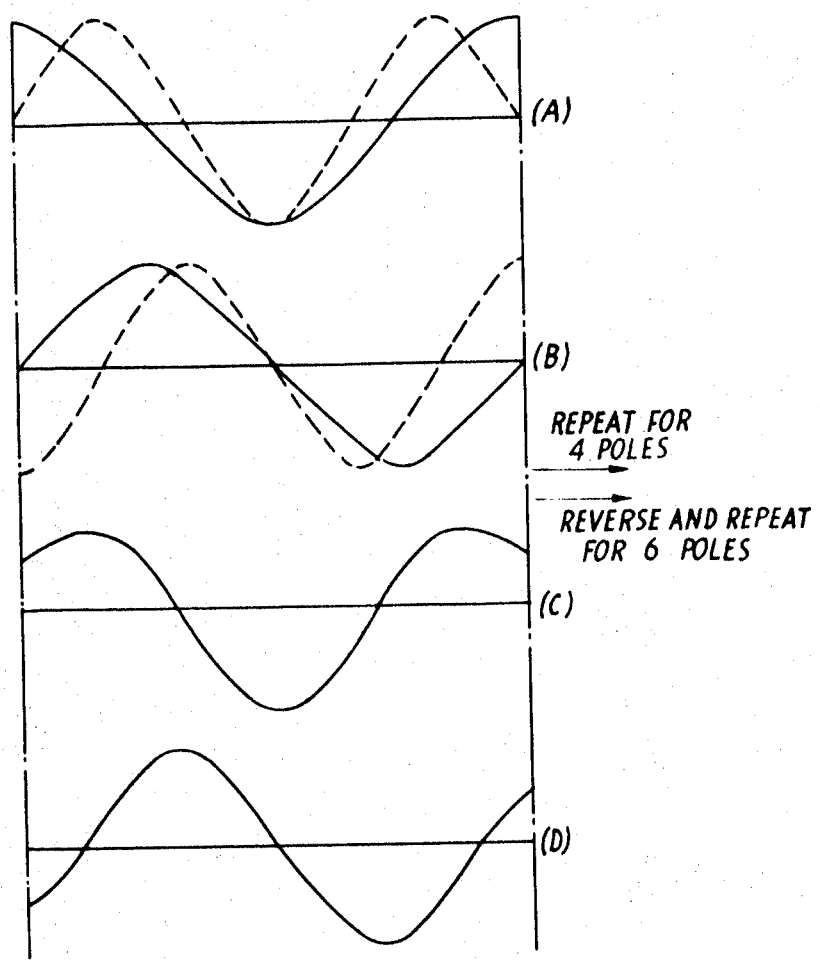
Figure 8:
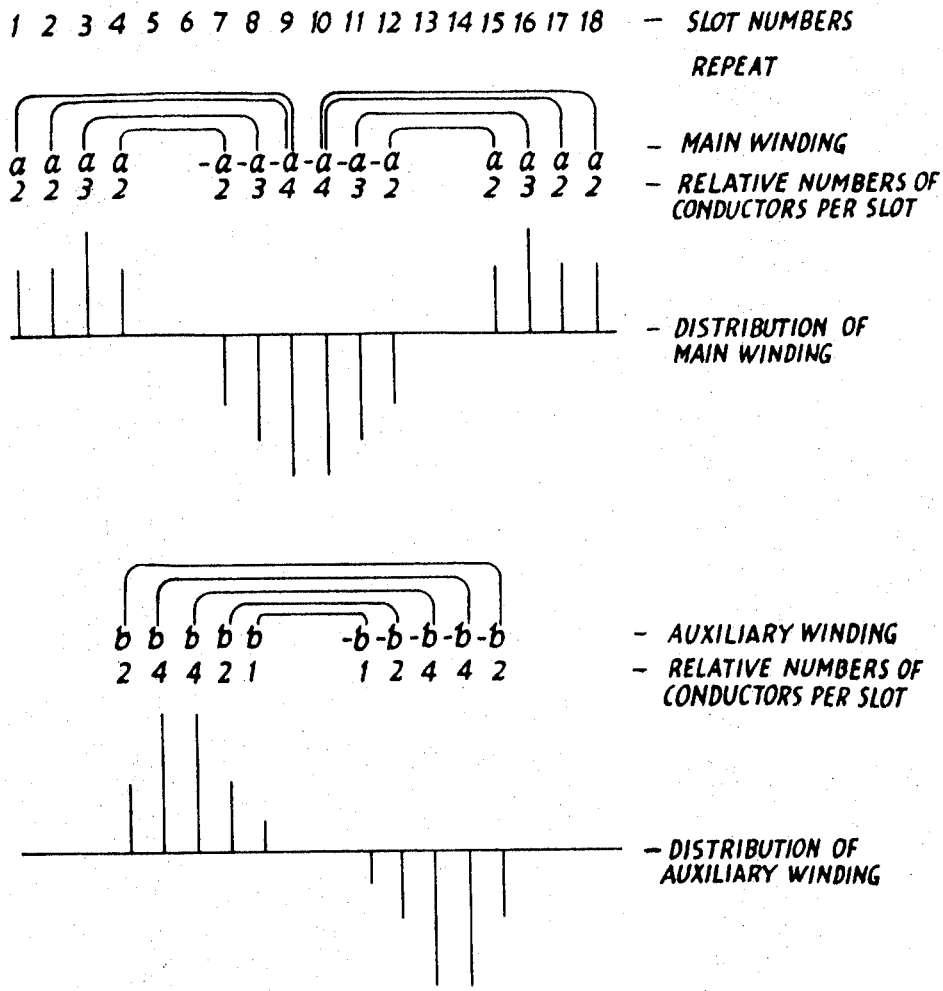
Figure 11:
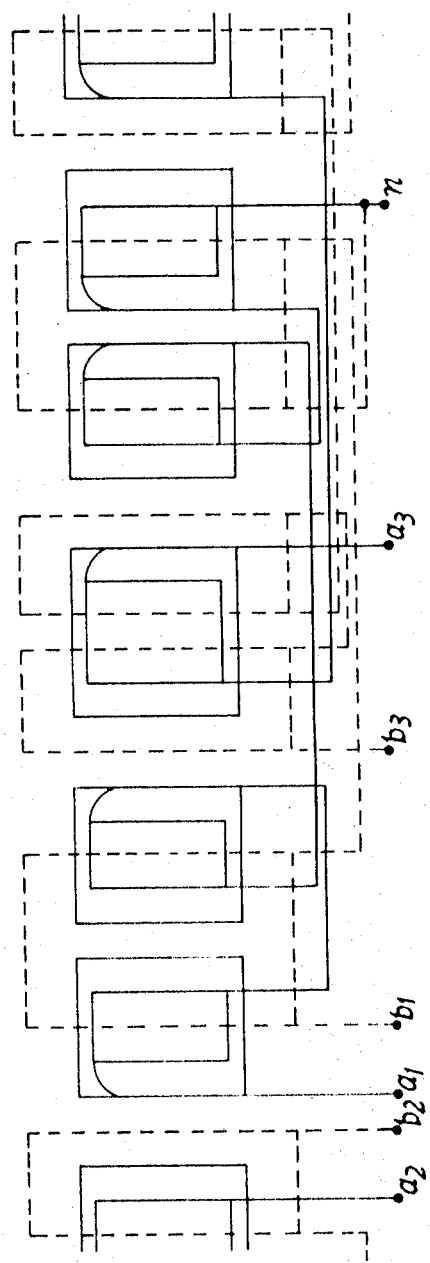
Figure 12:
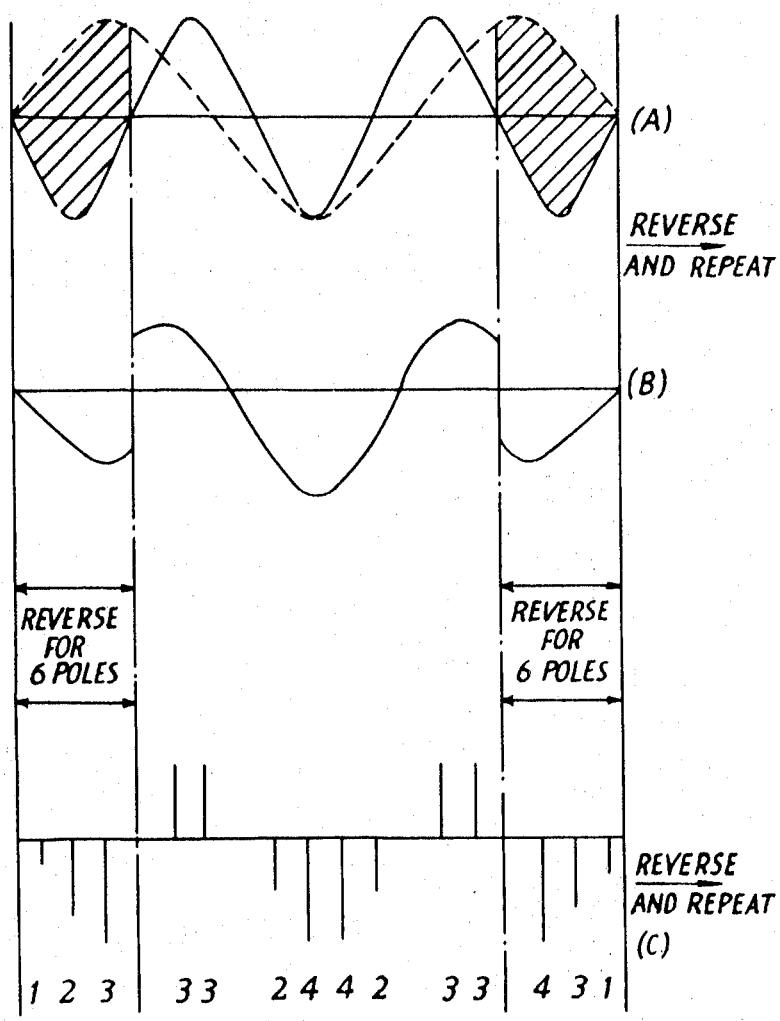
Figure 13:
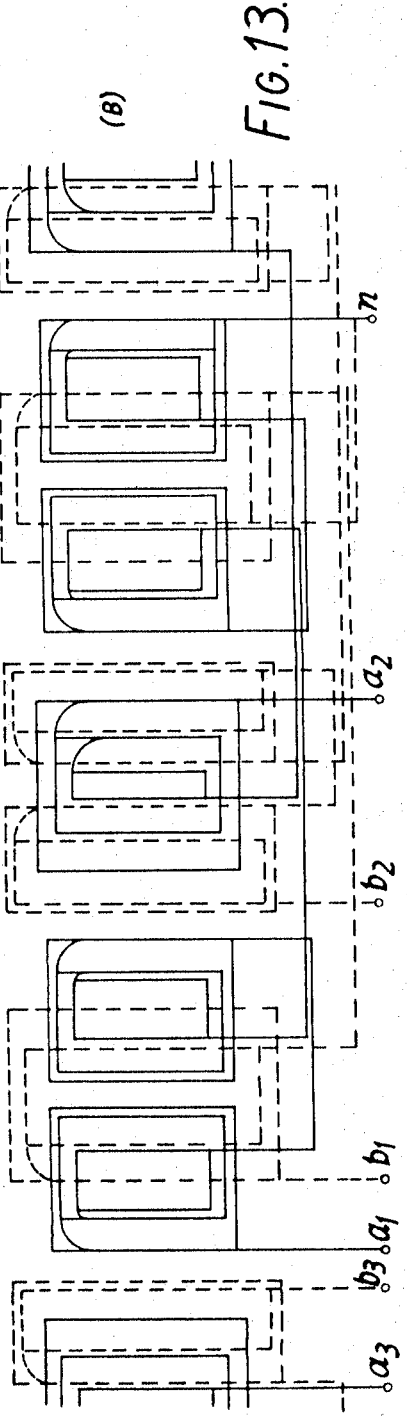

FIG. 6C showing the concentric configuration;

FIG. 7 is a composite diagram showing the effect of grading the conductors in a 4-pole/6-pole winding;

FIG. 8 is a composite diagram showing the actual conductor distribution of the main winding and the auxiliary winding in a 4-pole/6-pole machine;

FIG. 9 is a winding diagram showing a concentric winding for 4-pole/6-pole operation, with graded turns, in 36 slots;

FIG. 10 is a composite diagram showing the modulation of a 2-phase, 10-pole winding with 20 coil-groups to provide 6 poles;

FIG. 11 is a winding diagram showing a basic split-phase, 10-pole/6-pole winding in 36 slots;

FIG. 12 is a composite diagram showing the grading of conductors in the 10-pole/6-pole main winding of FIG. 11; and FIG. 13 is a winding diagram showing a graded, split-phase, 10-pole/6-pole winding in 36 slots.

A single-phase motor incorporates 'main' and 'auxiliary' phase-windings which are generally in electrical space quadrature, but usually comprise unequal numbers of turns and conductors of unequal cross sections. Basically, therefore, the single-phase motor is an unbalanced two-phase machine. It is known as a 'split-phase' motor to distinguish it from a balanced two-phase machine.

The term 'split-phase' is often used indiscriminately and it should be noted, therefore, that it refers here to a general class of single-phase motors of which there are many types. These may be divided, broadly, into three main categories known as 'impedance-start,' 'capacitor start/capacitor run' and 'permanent split-phase capacitor motors.' Although individual motors within the wide range of machines may differ in detail according to the load duty and the method of starting, the form of winding layout is much the same in each. It follows that the principle of pole-amplitude modulation may be examined in general terms in respect of phase-windings displaced in space by 90 electrical degrees.

The ampere-conductor distributions (winding distributions) of a 2p-pole split-phase machine may be written in the form:

$T_a = c_a \sin(p\theta)$
$T_b = c_b \sin(p\theta - \pi/2)$

In practice, each phase-winding contains harmonic components but, for simplicity, these are ignored.

Any change in the ampere-conductor distributions, by the reversal of current flow in parts of the phase-windings, for example, is equivalent to modulation of the original winding distribution. In principle, each phase-winding may be modulated in amplitude by a sine wave of 2K poles, say, such that:

$c_a = A \sin(k\theta)$
$c_b = B \sin(k\theta - \alpha)$ where $\alpha$ is the space displacement between the modulating cycles, measured on the scale of $k\theta$. The resultant ampere-conductor distributions become:

$T_a = A \sin(p^{**}) \sin(k\theta)$
$T_b = B \sin(p\theta - \pi/2) \sin(k\theta - \alpha)$ which may be rearranged in the form:

$T_a = A/2 \; \cos[(p-k)\theta] - \cos[(p+k)\theta]$
$T_b = B/2 \; \cos[(p-k)\theta - (\pi/2) + \alpha] - \cos[(p=k)\theta - \pi/2) - \alpha]$ After modulation, each phase-winding is seen to contain components of $2(p+k)$ poles and $2(p-k)$ poles.

The final two equations are similar in form to the three equations arrived at in relation to 3-phase windings. In order to eliminate the unwanted product of modulation in a 3-phase winding, the angle $\alpha$ may be shown to be necessarily equal to $\pm 2\pi/3$ radians ($\pm 2\pi/$ number of phases) on the scale of $k\theta$. If, however, the modulating cycles applied to the two-phase windings defined here are similarly displaced by $\pm 2\pi/$ (number of phases), i.e., O or $\pi$ radians on the scale of $k\theta$, the two resultant phase-windings are displaced by $\pi/2$ electrical radians with respect both to $2(p+k)$ poles and to $2(p-k)$ poles; since $T_a = A/2 \left\{ \cos[(p-k)\theta] - \cos[(p+k)\theta] \right\}$
$T_b = B/2 \left\{ \cos[(p-k)\theta \mp \pi/2] - \cos[(p+k)\theta \mp \pi/2] \right\}$ where the negative and positive signs correspond to $\alpha = 0$ and $\alpha = \pi$, respectively. Hence both products of modulation appear in the resultant m.m.f. waveform, whereas in the 3-phase case the unwanted field is eliminated.

In this respect, there is an important difference in the application of the p.a.m. method to split-phase windings. One of the products of modulation must be minimized, relatively to the other, in order to produce a satisfactory change-speed single-phase machine. It will be shown that this can be achieved by unequal coil-grouping, and by "grading" the numbers of turns in successive coils of the winding.

Any displacement other than O or $\pi$ radians between the modulating cycles gives rise to electrical displacements between the modulated phase-windings which differ from the desired value of $\pi/2$. A small departure from the ideal electrical spacing between phase-windings would be generally acceptable, but is rarely necessitated in practice.

A more rigorous analysis of p.a.m. applied to split-phase windings yields the familiar results associated with 3-phase windings; namely, the equivalences between modulation of a winding as a whole (total modulation) and modulation of the phase-windings individually (phase-by-phase modulation). In addition, the various techniques developed in the application of p.a.m. to 3-phase windings may be similarly applied to split-phase windings.

As with 3-phase p.a.m. windings, pole-changing split-phase windings may be classified as either symmetrical or asymmetrical according to the form of winding layout. It is shown in the following that a winding for any pole-pair combination which is basically an (odd/even) or (even/odd) ratio must necessarily be asymmetrical; whereas windings for pole-pair combinations in (odd/odd) ratios can be arranged symmetrically. For classification, pole-pair combinations must be reduced to their lowest terms; for example, 8/12 poles is equal to ⅔ poles, four times repeated, and is basically an (even/odd) ratio.

Referring now to the drawings, reference is made initially to the method of total modulation applied to balanced 2-phase windings. When both phase-windings are symmetrical with respect to the overall modulating cycle, that is, when the phase-windings are to be modulated in identical manner from their respective phase-origins, then the coil groups can be arranged symmetrically.

Figure 1A:
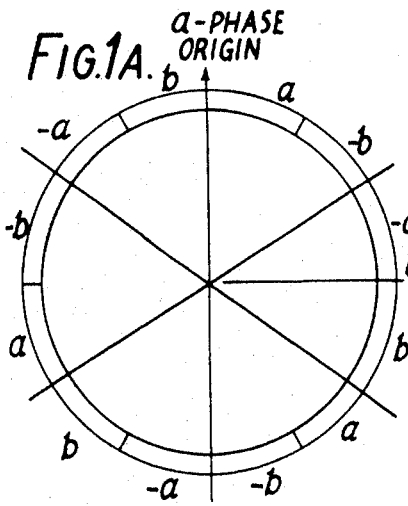
FIG. 1A is a clock diagram of a balanced 2-phase, 6-pole winding.

FIG. 1A shows a 2-phase, 6-pole winding distribution in the form of a 'clock diagram.' The phase windings are geometrically symmetrical about axes spaced $\pi/2$ mechanical radians apart. This is true of any 2-phase winding wound for an odd number of pole-pairs provided that successive halves of each phase-winding are identical. If the modulating cycle applied to the winding are identical. If the modulating cycle applied to the winding as a whole is of the same form when viewed either from the $a$-phase origin or from the $b$-phase origin, then each phase-winding can be arranged symmetrically. This will always be possible for an overall modulating cycle of $4n$ pole-pairs, where $n$ is an integer.

For comparison, a 3-phase p.a.m. winding is always symmetrical when modulated by a wave of $3n$ pole-pairs.

Thus, to obtain a symmetrical winding for which the original number of pole-pairs is odd, the final number of pole-pairs must also be odd (an odd number $\pm 4n=$ another odd number).

Figure 1B:
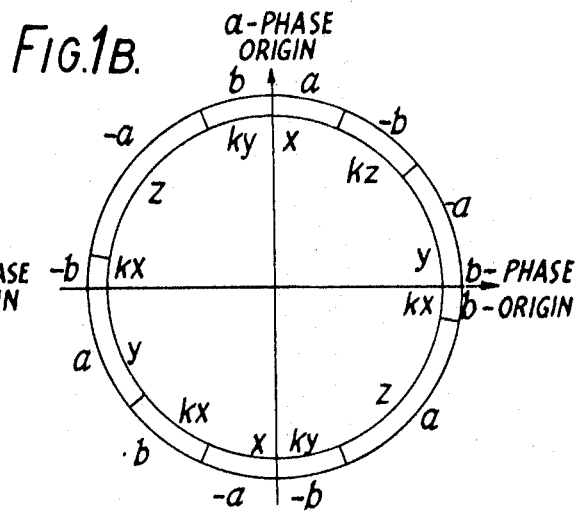
FIG. 1B is a clock diagram of a split-phase, 6-pole winding.

It may be readily seen by reference to the 6-pole winding of FIG. 1B that, provided the number of coils in each group in the $b$-phase is in a fixed proportion to the number of coils in corresponding groups of the $a$-phase, the winding as a whole satisfies the requirements of a single-phase machine.

The winding may be described as a "quasi-symmetrical" winding in which the $a$-phase is represented: $x-y-z$—repeat, and the $b$-phase is represented: $kx-ky-kz$—repeat. It becomes a split-phase winding in which the origins of the individual phase-windings are in the same relative positions as a truly symmetrical winding. Although the coils per phase are unequal, the phase-windings are displaced $\pi/2$ electrical radians before and after modulation. This applies to any split-phase winding wound for an odd number of pole pairs.

It follows that windings for pole-pair combinations in (odd/even) ratio can be obtained only by asymmetrical modulation.

Figure 1C:
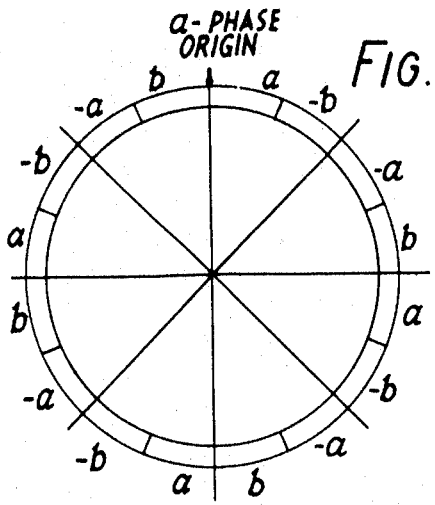
FIG. 1C is a clock diagram of a balanced 2-phase, 8-pole winding.

FIG. 1C shows a 2-phase, 8-pole winding layout. Unlike a winding wound for an odd number of pole-pairs, there is no geometric symmetry about axes displaced by $\pi/2$ mechanical radians. This is true of any winding wound for an even number of pole-pairs. The winding cannot be grouped symmetrically, therefore, for modulation to a final number of pole-pairs which differs by an even number from the original number of pole-pairs, unless the pole-combination is an integral multiple of an odd/odd ratio. Thus a winding for an (even/odd) pole-pair combination can be obtained only by asymmetrical modulation.

The number of motor leads and winding terminals for speed changing depends on the type of motor and the starting and running duties. Basically, however, there are only two methods of switching the main and auxiliary windings; that is, in parallel/series or series/series connection, as shown in FIGS. 2A and 2B.

In both these figures, the main winding parts are shown between terminal $n$ and the terminals prefixed $a$. The auxiliary winding parts are shown between the terminal $n$ and the terminals prefixed $b$.

Three supply leads are assumed, that is, two phase lines and a neutral as described below.

In the parallel/series arrangement of FIG. 2A, the $2p$-pole connection is obtained by joining together terminals $a_2$, $b_2$ and $n$ and supplying terminals $a_1$, $b_1$ and $n$. The $2q$-pole connection is obtained by isolating terminals $a_1$ and $b_1$ and supplying terminals $a_2$, $b_2$ and $n$. In the series/series arrangement of FIG. 2B, the $2p$-pole connection is obtained by joining terminals $a_3$ and $a_1$, joining terminals $b_3$ and $b_1$ and supplying terminals $a_2$, $b_2$ and $n$. The $2q$-pole connection is obtained by joining terminals $a_2$ and $a_1$, joining terminals $b_2$ and $b_1$ and supplying terminals $a_3$, $b_3$ and $n$.

The parallel/series arrangement requires five winding terminals and the series/series arrangement requires seven winding terminals. For reversing the direction of rotation one extra lead is needed in each arrangement.

In order to produce a phase displacement between the currents in the main and auxiliary windings there is generally an intermediate "phase-splitter" between the single-phase supply and the motor terminals. The phase-splitter usually consists of an impedance connected between one supply lead and the auxiliary winding (although the internal impedance of the auxiliary winding itself is sometimes sufficient). The motor is supplied, effectively, from three supply lines which constitute an unbalanced two-phase system; although, in reality, there are only two supply lines. Accordingly, the switching sequences of FIGS. 2A and 2B assume a three-line supply system to exist.

The switching may be simplified, and the number of winding terminals reduced by pole-changing the main winding only. For example, the main winding may be wound for $2p$-poles/$2q$-poles, but the auxiliary winding may be wound just for $2q$-poles. The motor would always be started in the $2q$-pole connection. For speed selection, a minimum of three leads only, are needed, as shown in FIG. 3.

In FIG. 3, the main winding is shown connected between terminals $n$, $a_1$ and $a_2$. the auxiliary winding is connected between terminals $n$ and $b$. An external impedance 10 and centrifugal switch 11 are shown connected serially between terminals $a_2$ and $b$.

For starting at $2q$-poles, the supply is connected to terminals $a_2$ and $n$, and the terminal $a_1$ is isolated. For running at $2p$-poles, terminals $a_2$ and $n$ are connected together and the supply is connected to terminals $a_1$ and $n$.

The application of the principle to split-phase windings is best explained in reference to particular examples. Two examples are described here in detail; a 4/6 pole winding, which must necessarily be asymmetrical, and a 10/6-pole winding, which can be grouped symmetrically. Reference is made initially to balanced 2-phase windings.

FIG. 4A shows a uniformly grouped, 2-phase, 4-pole, winding layout; and FIGS. 4B and 4C show 2-pole modulating cycles applied to the $a$-phase and the $b$-phase at origins of O and $\pi$ mechanical radians, respectively. Ideally, the number of turns per group should correspond with the amplitude of these waves at the center points of the coil-groups. After modulation, the winding contains 2-pole and 6-pole components, it being desired to operate the machine at 6 poles.

It is seen in FIG. 4D that the same resultant coil-group distribution would be obtained by modulation of the winding as a whole by a wave of 10 poles. Thus, 'difference' modulation on a phase-by-phase basis is equivalent to 'sum' modulation with respect to the winding as a whole. It is also clear that, when the individual 2-pole modulating cycles are rearranged to be in space-phase, difference modulation on a phase-by-phase basis is equivalent to difference modulation overall —except for the complete reversal of phase-winding 'b.' It follows that the four possible forms of modulation are all equivalent.

An important outcome of modulation by any one of the equivalent methods is that two 'conjugate' harmonics appear in the resultant winding distribution. 2-pole modulation of the original 4-pole winding clearly gives rise to an unwanted 2-pole subharmonic, and equivalent 10-pole modulation produces an unwanted 14-pole harmonic; each in addition to the desired 6-pole main field. More generally, if $p$ is the original number of pole-pairs, and $q$ is the number of pole-pairs after modulation, the two conjugate harmonics are of orders $(2p-q)$ and $(2p+q)$.

FIG. 4E shows a modified winding layout in which phase '$a$' occupies more space than phase '$b$.' The new distribution is representative of a split-phase winding. Despite the change in coil-grouping, the modulating cycles can be applied at the same origins, so that the phase-windings maintain the same space relationship of $\pi/2$ electrical radians, before and after modulation.

FIG. 5 at (A) shows a 4-pole/6-pole split-phase winding layout in 36 slots. The coil-grouping with respect to a total modulating wave of 2 poles is:

$a$-phase: 3–6–3,3–6–3
$b$-phase: –3–3—3–3–

The winding may be arranged concentrically as shown at (B) in FIG. 5. This will always be possible when the coil-grouping is of the form:

$a$-phase: $x$–$2x$–$x$, $x$–$2x$–$x$
$b$-phase: –$y$–$y$—$y$—$y$– where $(8x = 4y) =$ slot number. The winding is shown connected for parallel/series switching, for 4/6 poles, corresponding to the diagrammatic arrangement of FIG. 2A.

As each phase-winding is uniformly grouped with respect to 4 poles, and totally 'irregular' with respect to 6 poles, the latter connection is rich in harmonics. The harmonics can be reduced to an acceptable level, however, by grading the numbers of turns in successive coils of the winding. The grading must clearly be a compromise between that which would ideally be required for 4 poles and that which would ideally be required for 6 poles.

In a single-phase machine, it is necessary to arrange for sinusoidal distribution of the ampere-conductors if a sinusoidal m.m.f. waveform is to be obtained, since the latter is the integral of the former. In a 3-phase machine a near-sinusoidal m.m.f. wave is obtained by integration of the ampere-conductors of the three phases, and linear distribution of the ampere-conductors is normal.

The 12-slot, 2-pole, single-phase (split-phase) winding shown in FIG. 6 illustrates the distribution of conductors, and the concentric winding configuration which is commonly employed. Each coil-group in the phase-windings of FIG. 6A and FIG. 6B is spread over a complete pole-pitch of 180 electrical degrees, and occupies half the total number of slots. The relative numbers of conductors in successive slots may be arranged in a sinusoidal pattern as follows: $a$-phase: sin 15°, sin 45°, sin 75°, sin 75°, sin 45°, sin 15°,
and repeat.
$b$-phase sin 75°, sin 45°, sin 15°, sin 15°, sin 45°, sin 75°, and repeat.

The occupied by the auxiliary winding is generally between one half and two-thirds of the space occupied by the main winding. Each slot is not completely full, but the utilization of the available winding space is nevertheless high, at about 90 percent.

Such a winding departs from the absolute ideal only in so far as the conductors are concentrated in slots. The winding factor may be shown to approach a value of $\pi/4(=0.785)$, which corresponds to that of a winding distributed sinusoidally along the surface of an unslotted structure. In practice, winding factors differ very little from the value of 0.785.

Two processes are involved in the design of a split-phase, p.a.m., pole-changing winding. Firstly, the winding is grouped according to the shape of the modulating waves; and the coil-groups which need to be reversed on modulation may thus be identified. This is exactly comparable to the design of a 3-phase p.a.m. winding. Secondly, the coil-sides in each group are graded according to a compromise between the ideal conductor distributions for each of the two pole-numbers, this process being comparable to the design of a single-speed single-phase winding. The resultant conductor distribution must further be such that a concentric winding pattern becomes physically possible. It will usually be necessary to accommodate coils from the main winding and also coils from the auxiliary winding in certain of the slots. Other slots will be exclusively occupied by one winding or the other. This kind of arrangement is similar to that of conventional single-speed, split-phase windings.

FIG. 7 illustrates the method by which the conductors in each half phase-winding of a 4/6 pole winding may be graded. FIG. 7A shows ideal sinusoidal conductor-distributions of the auxiliary winding, say, for both 4 poles and 6 poles. FIG. 7B shows the corresponding distribution of the auxiliary winding, each waveform of FIG. 7B having the correct electrical space relationship with the corresponding waveforms of FIG. 7A.

A compromise between the ideal winding distributions for the main and auxiliary windings are shown in FIG. 7C and FIG. 7D, respectively. The necessary asymmetry between the two resultant distributions is clearly apparent. Each may be biased towards one or other of the pole-numbers, at will.

The two halves of each phase-winding are identical, and when connected in the same sense for 4 poles, no 6-pole component can be produced. Similarly, when connected in the reverse sense for 6 poles, no 4-pole component can be produced.

Concentric groups of coils must be arranged to conform as nearly as possible to the conductor distributions of FIG. 7C and FIG. 7D. One such coil grouping arrangement is shown in FIG. 8 where, for simplicity, the relative numbers of conductors per slot have been given integral values.

In FIG. 8, the slot numbers for eighteen slots are shown at the head of the drawing. The next portion of the figure, below, shows the main winding, with the relative numbers of conductors per slot. The distribution and sense of the main winding are shown by the height and direction of the lines below, corresponding to the winding in 14 of the 18 slots.

In the lower part of the figure is correspondingly shown the auxiliary winding with the relative numbers of conductors per slot thereof. The distribution and sense of the auxiliary winding are finally shown by the height and direction of the lines below, corresponding to the auxiliary winding in 10 of the 18 slots.

The concentric winding layout is shown in FIG. 9.

In FIG. 9, the slot numbers for 36 slots are shown at the head of the figure. Below are shown the conductor distribution and current-carrying sense of the main winding in 28 of the 36 slots of the entire armature. The sense indications relate to the 4-pole connection. The portion reversed for the 6-pole connection is shown by the horizontal bracket.

The auxiliary winding conductor distribution and current-carrying sense is similarly shown below. The sense indication relates to the 4-pole connection and the horizontal bracket indicates the part reversed for the 6-pole connection.

The main part of the Figure shows the main winding in solid lines and the auxiliary winding in broken lines, connected respectively between terminals $n$, $a_1$ and $a_2$ and terminals $n$, $b_1$ and $b_2$, as also shown in FIG. 2A.

If the same gauge of wire is used for all coils, the available winding space would be 32/36ths (= 89 percent) filled.

The total number of turns in each phase-winding can, of course, be selected as desired. The winding factors for the main winding can be shown to be 0.784 and 0.737, with respect to 4 poles and 6 poles, respectively; and the harmonic content is at an acceptably low level in both connections. These winding factors compare favorably with the figure of 0.785, which is the approximate winding factor of a conventional single-speed single-phase winding.

FIG. 10 refers to the particular example of 10/6 poles. FIG. 10A shows a 2-phase, 10-pole winding which is to be modulated to 6 poles. On a phase-by-phase basis, individual 4-pole modulating cycles, to be applied to each phase-winding, must be spaced O or $\pi$ radians on the scale of 4 poles; i.e., by O or $\pi/2$ mechanical radians. Zero displacement between two individual 4-pole modulating cycles is clearly equivalent to total modulation by 4 poles, as shown in FIG. 10A.

Modulation by waves of 4 poles spaced $\pi/2$ mechanical radians is shown in FIG. 10B, and gives rise to equivalent total modulation by 16 poles as shown in FIG. 10C. The resultant 6-pole winding layouts of FIG. 10A, FIG. 10B and FIG. 10C, are identical after modulation except for the reversal of phase '$b$.' This again confirms the equivalence between all the forms of modulation, as explained earlier herein. As expected from earlier considerations, the phase-windings are symmetrical with respect to the modulating waves.

A 10/6 pole split-phase winding in 36 slots is shown in FIG. 11. the winding has been 'pregrouped' to reduce the harmonic content after modulation.

In FIG. 11, the slot numbers for the 36-slot armature are shown at the head of the figure. Below, at (A), is shown the winding layout and current-carrying sense of the main winding parts "$a$" and the auxiliary winding parts "$b$". The sense indications relate to the 10-pole connection and the winding portions reversed for the 6-pole connection are shown by the horizontal brackets.

The main portion of the figure, at (B), shows the concentric configuration of the whole winding, the main winding being shown in solid lines and the auxiliary windings in broken lines. The main winding parts are connected between terminals $n$, $a_1$, $a_2$ and $a_3$ and the auxiliary winding parts are connected between terminals $n$, $b_1$, $b_2$ and $b_3$, as also shown in FIG. 2B.

The coils per group in the $b$-phase (auxiliary winding) are in the ratio of 1:2 compared with the corresponding coil-groups of the $a$-phase (main winding). The grouping has also been selected to permit the concentric winding configuration shown.

The m.m.f. waveform produced by the basic 10/6-pole winding arrangement of FIG. 11 can be further improved by grading the winding according to the procedure explained in relation to the particular case of 4/6 poles. For the basic winding arrangement given, the winding factors of the main winding can be shown to be 0.776 and 0.719, for 10 poles and 6 poles, respectively.

FIG. 12 illustrates the method by which the conductors in the 10/6 pole winding are graded. Separate ideal sinusoidal distributions, for 10 poles and 6 poles are shown in FIG. 12A. The compromise distribution for a single main winding is shown in FIG. 12B. The two outer sections of this represent a mean between the shaded parts of the ideal 10-pole waveform and the reverse of the shaded parts of the ideal 6-pole distribution. This is seen to be compatible with the necessary reversal of coils in FIG. 11A, as dictated by the form of modulation.

FIG. 12C shows the relative numbers of conductors per slot to conform approximately to the waveform of FIG. 12B and to the coil-grouping of the main winding given in FIG. 11A.

The auxiliary winding must be distributed in basically the same manner as the main winding, but displaced $\pi/2$ mechanical radians. As the auxiliary winding occupies fewer slots, however, its distribution will not, in general, be identical to that of the main winding. The correct electrical spacing will nevertheless be maintained if the phase-windings have axes of symmetry spaced $\pi/2$ mechanical radians apart.

The overall graded winding layout of a 36-slot 10-pole/6-pole machine is shown in FIG. 13.

In FIG. 13, as is the earlier winding diagrams, the slot numbers of the 36-slot armature are shown at the head of the figure. Below, at (A), is shown the distribution and current-carrying sense of the main winding "$1$" and the auxiliary winding "$b$." The sense indications relate to the 10-pole connections and the reversal of winding parts for the 6-pole connections are shown by the brackets.

The main portion of the diagram, at (B), shows the concentric configuration of the total winding, the main winding being shown in solid lines and the auxiliary winding in broken lines. The main winding parts are connected between terminals $n$, $a_1$, $a_2$ and $a_3$ and the auxiliary winding parts between terminals $n$, $b_1$, $b_2$ and $b_3$, as also shown in FIG. 2B.

The main winding distribution corresponds to that shown in FIG. 12C, and the auxiliary winding is distributed in similar, but not identical manner, to give the correct electrical spacing, and to make the best use of the available winding space. Using the same gauge of wire for all coils, the available winding space would be 34/36ths (= 95 percent) filled. The winding factors of the main winding can be shown to be 0.792 and 0.721, for 10 poles, and 6 poles, respectively. As for the graded 4-pole/6-pole winding, these winding factors compare favorably with the value of 0.785, which is the winding factor of an ideal split-phase winding for a single-spaced machine.

What we claim is:

1. In a two-speed, single-phase, alternating current motor, an arrangement comprising a wound stator comprising a main winding, and an auxiliary winding for providing starting torque, said main winding comprising first and second parts; and means for connecting said first and second parts together in first and second ways corresponding to the two motor speeds, one of said ways providing reversed current flow in one of said first and second main winding parts; each of said first and second main winding parts comprising coils having a graded number of turns increasing from the coils of greater pitch to the coils of lesser pitch.

2. In a two-speed, single-phase, alternating motor, a wound stator as claimed in claim 1, wherein each of said first and second main winding parts itself comprises first and second winding parts of concentric coils having a graded number of turns increasing from the coils of greater pitch to the coils of lesser pitch.

3. In a two-speed, single-phase, alternating current motor, a wound stator as claimed in claim 1 wherein the windings of said auxiliary winding provide alternative pole numbers corresponding to the two running speeds.

4. In a two-speed, single-phase, alternating current motor, a wound stator as claimed in claim 1, wherein said auxiliary winding provides a single pole number corresponding to the lower of the two running speeds.

5. In a two-speed, single-phase, alternating current motor, a wound stator as claimed in claim 1, wherein each of said first and second main winding parts is spread over 180 electrical degrees.

6. In a two-speed, single-phase, alternating current motor, a wound stator as claimed in claim 1, wherein said auxiliary winding occupies one-half to two-thirds as much of the stator winding space as is occupied by the main winding.

7. In a two-speed, single-phase, alternating current motor, a wound stator as claimed in claim 1, wherein each of said first and second main winding parts itself comprises first and second winding parts of concentric coils having a graded number of turns increasing from the coils of greater pitch to the coils of lesser pitch so that the main winding comprises first phase and second phase portions arranged in space quadrature in both running speeds.

8. In a two-speed, single-phase, alternating current motor, an arrangement comprising a wound stator comprising a main winding, and an auxiliary winding for providing starting torque, said main winding comprising first and second parts; and means for connecting said first and second parts together in first and second ways corresponding to the two motor speeds, one of said ways providing reversed current flow in one of said first and second main winding parts; each of said first and second main winding parts comprising coils having a graded number of turns.

9. In a two-speed, single-phase, alternating motor, a wound stator as claimed in claim 8 wherein the auxiliary winding provides a single pole number corresponding to one of the two running speeds.